United States Patent [19]

Schmidt

[11] Patent Number: 5,127,588
[45] Date of Patent: Jul. 7, 1992

[54] TIRE CHIPPER

[75] Inventor: Raymond H. Schmidt, Buffalo, Minn.

[73] Assignee: Tire Service Equipment Mfg. Co. Inc., Monticello, Minn.

[21] Appl. No.: 653,651

[22] Filed: Feb. 11, 1991

[51] Int. Cl.⁵ .............................................. B02C 19/12
[52] U.S. Cl. ..................................... 241/97; 241/225; 241/240; 241/243; 241/295; 241/DIG. 31
[58] Field of Search .............. 241/243, 242, 241, 240, 241/239, DIG. 31, 295, 222, 224, 225, 97

[56] References Cited

U.S. PATENT DOCUMENTS

| | | | |
|---|---|---|---|
| 821,448 | 5/1906 | Albrecht. | |
| 1,355,093 | 10/1920 | Herche. | |
| 1,365,228 | 1/1921 | Davidson. | |
| 1,396,108 | 11/1921 | Gilmore. | |
| 1,661,721 | 3/1928 | Gardner. | |
| 3,396,914 | 8/1968 | Liebman. | |
| 3,931,935 | 1/1976 | Holman. | |
| 4,000,860 | 1/1977 | Gotham | 241/242 |
| 4,015,782 | 4/1977 | Granite. | |
| 4,161,296 | 7/1979 | Parker et al.. | |
| 4,298,170 | 11/1981 | Snavely. | |
| 4,374,573 | 2/1983 | Rouse et al.. | |
| 4,422,581 | 12/1983 | Chryst | 241/DIG. 31 X |
| 4,519,550 | 5/1985 | Rouse. | |
| 4,684,071 | 8/1987 | Dicky | 241/DIG. 31 X |
| 4,706,899 | 11/1987 | Parker et al. | 241/242 X |
| 4,778,114 | 10/1988 | Panning. | |
| 4,881,692 | 11/1989 | Goldhammer et al.. | |

FOREIGN PATENT DOCUMENTS 249985  2/1989  Canada ................................ 241/242

*Primary Examiner*—Mark Rosenbaum
*Attorney, Agent, or Firm*—Haugen and Nikolai

[57] ABSTRACT

A machine for reducing worn-out vehicle tires to small chip-like particles comprises a frame on which an elongated shaft is journaled for rotation, the shaft having a first and second plurality of rotary cutting blades, each of a different diameter affixed to the shaft so as to be rotatable therewith. Also affixed to the frame is a set of stationary cutter bars whose sharpened edges are disposed within a predetermined close tolerance to the periphery of the rotary cutting blades. A large, massive flywheel is attached to one end of the shaft and is driven by a suitable motor. Surrounding the rotary cutting blades is a shroud which, in turn, suppots an infeed hopper having a spiked drum journaled therein. A chain and sprocket combination couples the infeed drum to the elongated shaft such that when the shaft is driven and relatively large chunks of vehicle tire material is placed into the infeed hopper, it will be forced between the teeth of the rotary cutting blades and hence carried by the rotary cutter through the stationary cutter bars.

8 Claims, 2 Drawing Sheets

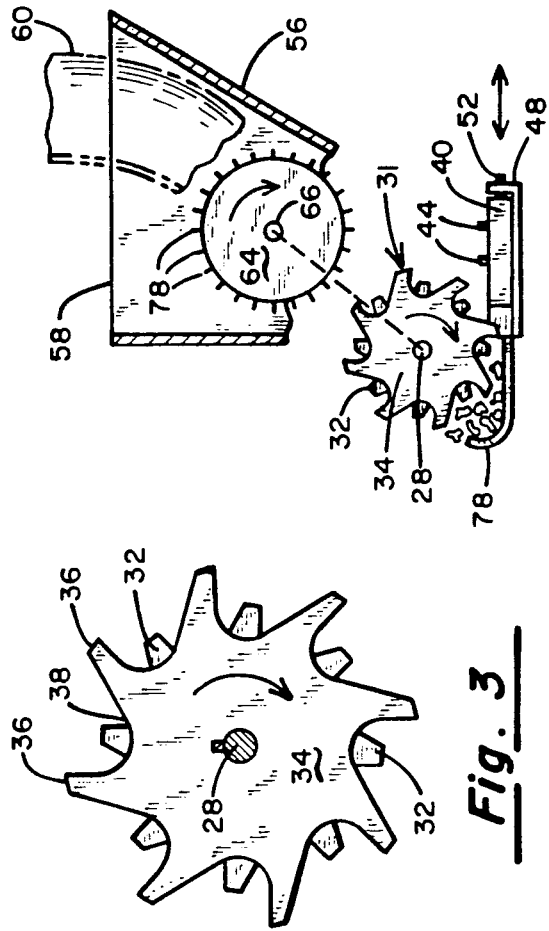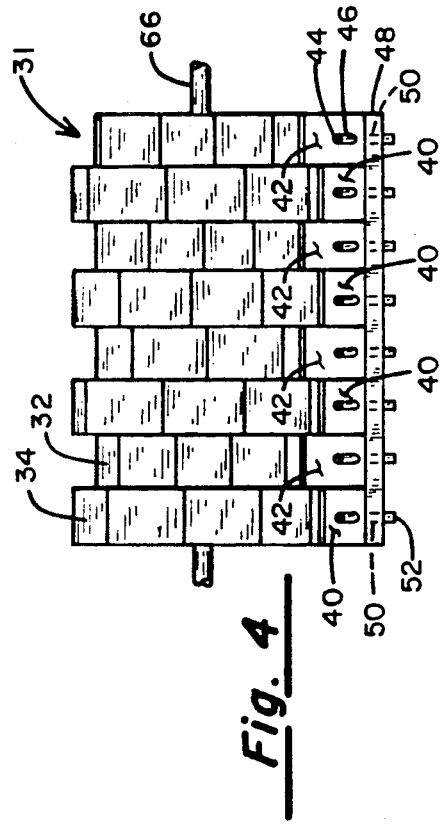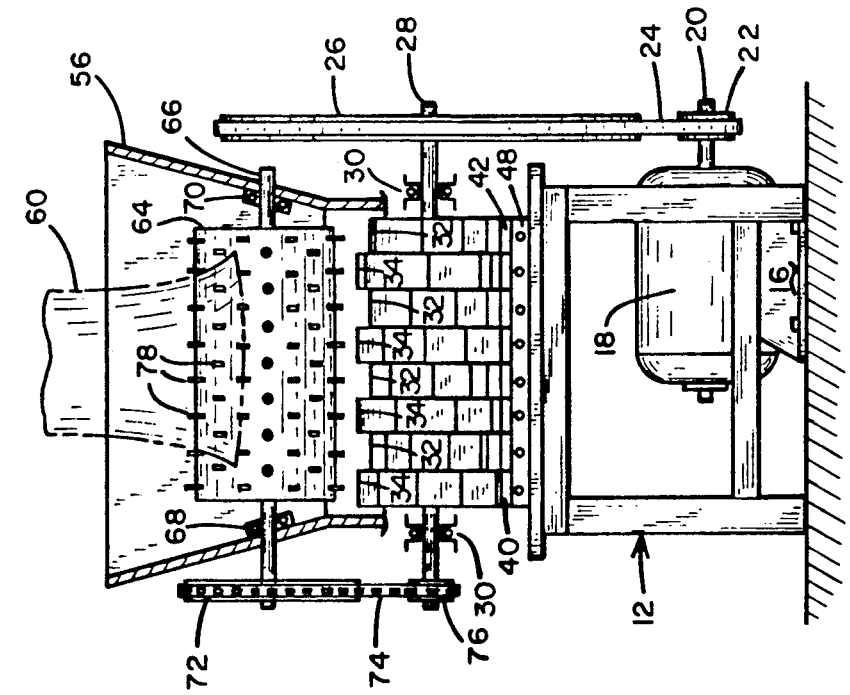

TIRE CHIPPER

BACKGROUND OF THE INVENTION

I. Field of the Invention

This invention relates generally to equipment for disposing of used vehicle tires, and more particularly to a machine which reduces such tires to small size chips or particles that can later be used in the fabrication of various products or as a burnable fuel.

II. Discussion of the Prior Art

For many years, worn-out vehicle tires were commonly disposed of by burying same in landfills. Because vehicle tires are made from various synthetic rubber materials, they tend not to be biodegradable and, hence, will remain for many years buried in the earth. Because of environmental concerns and the premium being placed on space available for landfills, many such operations are refusing to accept worn-out vehicle tires for disposal. When stored above ground, they tend to become breeding grounds for mosquitoes and a potential fire hazard which can burn for weeks while emitting billowing clouds of black, soot-filled smoke.

Typical vehicle tires being made today are made up from a combination of steel, nylon cording and artificial rubber. The steel tends to be in the form of single or multi-filer strands which are woven into radial and circumferential belts and which are buried in the rubber. The artificial rubber is extremely rich in petroleum products and, when the tire is suitably pulverized, the resulting particulate can be burned as a fuel in an appropriately designed furnace for producing heat or steam but without creating environmentally destructive emissions.

In addition to being a burnable commodity, pulverized vehicle tires have found use in the fabrication of various products, such as roofing materials, additives to asphalt to be used for roadways and the like, etc.

Because of the nature of vehicle tires, they are quite difficult to reduce to a pulverized form. The steel belting and the steel bead surrounding the central opening become difficult to cut, especially when embedded in an elastomeric body.

The Granite U.S. Pat. No. 4,015,782 describes a machine for cutting up tire segments into small pieces or chips, but because of its design, it is not capable of dealing with steel belted radial tires. At the time that the application for the Granite patent was filed, steel belted radial tires were just coming on the scene and predominantly the tires which had worn out to the point where they were ready to be scrapped were of the solid rubber variety, such as shown in the drawings of that patent or, at most, they would only have glass belt construction.

When dealing with steel belted product, the teeth of the rotary cutting blades and the stationary cutting bars become worn after fairly short periods of use. As such, it becomes necessary to periodically resharpen the blades or go to the expense of replacing same. Because the apparatus shown in the Granite patent does not provide a means for precisely adjusting the tolerance or spacing between the stationary blades and the rotary cutting blades, it cannot accommodate the changes in blade dimension due to sharpening.

Another drawback of the device of the Granite patent is that there is no relief space provided in the rotary cutting blades into which cut pieces of tire can flow. Hence, the annular void or spacing between the parallel blades will tend to become packed with rubber fragments which becomes wedged therebetween, requiring frequent shut-down for maintenance purposes.

The Holman U.S. Pat. No. 3,931,935 describes yet another machine intended for reducing vehicle tires to small pieces or chunks. Here the device comprises a pair of parallel shafts each supporting a series of rotary knives or cutting disks which intermesh with one another. Devices built in accordance with the Holman patent tend to shred the tire by tearing it up rather than by slicing or cutting. Moreover, it is found that such a design does not allow the pieces to be reduced to a sufficiently small size which would allow them to be readily handled as a fuel.

OBJECTS

It is accordingly a principal object of the present invention to provide an improved machine capable of accepting pieces of tire, even steel-reinforced tire, which have been cut into quarters in a shearing operation and feeding same through a rotary cutter assembly for reducing the tire segment to small chips and in which the blade tolerance can easily be adjusted to accommodate for wear.

Another object of the invention is to provide a motor-driven rotary cutting machine which is designed to chip and pulverize segments of worn-out vehicle tires to the point where the resulting pulverized material can be augured into a furnace and burned as a fuel.

SUMMARY OF THE INVENTION

The foregoing objects are achieved in accordance with the present invention by providing a frame structure for supporting first and second spaced-apart pillow blocks in which an elongated shaft is journaled for rotation. A large diameter flywheel is secured to one end of the shaft where the flywheel is arranged to be driven by a suitable prime mover, such as an electric motor or an internal combustion engine. Affixed to the shaft and rotatable therewith are first and second sets of plural rotary cutter blades, each blade having a plurality of teeth of a predetermined width dimension and each set of a differing diameter. The cutter blades are arranged in side-by-side relation on the shaft and adjacent ones of the rotary blades from a different set and thus are of different diameter. Also supported on the frame are a plurality of stationary cutter bars, each with sharpened edges. They are positioned within a predetermined close tolerance to the teeth on the rotary cutting blades as those blades are driven past the stationary cutter bars.

An infeed device is also provided which accepts relatively large pieces of vehicle tire, e.g., quarters, and which operates to feed those pieces into engagement with the rotary cutters which then drag the segment over and through the stationary cutting bars and, in doing so, cut and sever the tire segment into particles typically having a size of about $\frac{3}{4}"\times 1"$. The infeed device preferably comprises a drum having a plurality of radially extending spikes, the drum being journaled for rotation in a chute disposed adjacent to the rotary cutting blades. The drum of the infeed device is coupled by a chain and sprocket arrangement to the shaft on which the rotary cutting blades are mounted and rotates at about 1/10th the angular velocity of the cutters, e.g., 20 rpm.

Means are also provided for manually adjusting the spacing between the periphery of the rotary cutters and the sharpened edges of the stationary cutter bars as blade-wear occurs. More particularly, a stationary angle iron is attached to the frame and extends transverse to the plurality of side-by-side oriented stationary cutting bars and parallel to the shaft on which the rotary cutters mount. A plurality of threaded bores, one for each stationary bar, is formed through the angle iron, and fitted into those threaded bores are set screws which may be turned by an allen wrench or the like to establish the stationary cutter bar to rotary cutter blade gap.

To insure that the particles resulting from the cutting or chipping operation are of a predetermined small size, it has been found convenient to also mount on the frame a rake-like arrangement having a plurality of spaced-apart arcuate tines, the rake being positioned in operative cooperation with the rotary cutter for forcing pieces that need to be further reduced back into the pockets between the teeth of the rotary cutters so that they will again be carried through the stationary cutter bars. In this fashion, it is assured that only those particles sufficiently small to pass between the tines of the rake will find their way to the machines output hopper or conveyor.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 2 is an end view with a portion of the hopper shroud cut away to reveal the internal working parts;

FIG. 3 is an end view of the rotary cutting blade of FIG. 1;

FIG. 4 is a top view illustrating the rotary cutter profile; and

FIG. 5 is a schematic mechanical drawing of FIG. 1 illustrating the rake assembly used to recirculate oversize pieces of chipped tire.

DESCRIPTION OF THE PREFERRED EMBODIMENT

Figure 1:
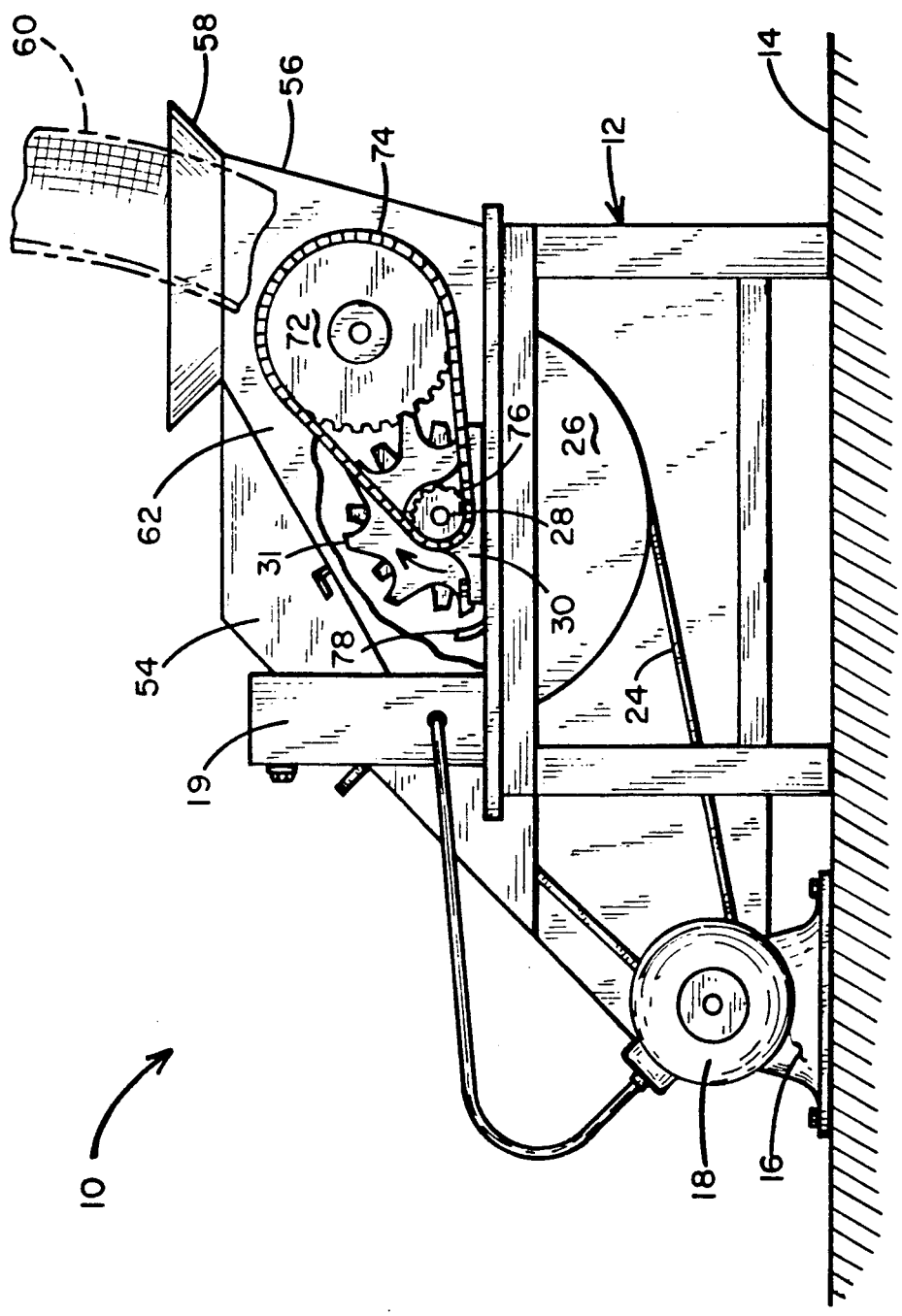
FIG. 1 is a side elevation of the tire chipping machine of the present invention.

Referring first to FIG. 1, there is indicated generally by numeral 10 the tire chipping machine in accordance with the present invention. It is seen to comprise a table-like frame 12 on which the tire chipping machine is mounted. Bolted to the floor 14 is a motor mount 16 supporting a multi-horsepower electric motor 18 used to drive the equipment. If the machine of the present invention is to be utilized out-of-doors at a location where electrical power may not be available, the motor 18 may readily be replaced with a multi-cylinder internal combustion engine. With an elective motor drive, a NEMA switch box 19 is mounted on the frame's table surface and contains an appropriate power switch and circuit breaker.

With reference next to FIG. 2, the motor 18 has an output shaft 20 to which is affixed a V-belt pulley 22. A V-belt 24 is played about the pulley 22 and around the periphery of a relatively large diameter, massive steel flywheel 26 which is affixed to the end of an elongated shaft 28. The shaft 28 is journaled for rotation in pillow-block bearings 30 which are schematically represented in the view of FIG. 2 but which are illustrated in FIG. 1 to be bolted to the top of the table-type frame 12.

Keyed to the shaft and rotatable therewith are first and second sets 32 and 34 of rotary cutter blades 32. As can be seen from the end elevation view of FIG. 2, the blades in set 32 are of a lesser diameter than the blades in set 34, the two being alternatively disposed in side-by-side relationship to one another on the shaft 28.

FIG. 3 is a sectional view showing the blade profile. They are substantially identical for the sets 32 and 34, the only difference being that the outside diameter of the blades 32 is slightly less than the outer diameter of the blades 34. Thus, it can be seen that each of the blades 32 and 34 have a plurality of relatively wide teeth 36 which are separated from one another by an arcuate pocket 38. The teeth on the rotary cutter set 32 are staggered in their alignment relative to the teeth on the rotary cutter set 34. It is for this reason that in the end view of FIG. 3, the teeth on the set 32 can be seen to be in general alignment with the arcuate pockets 38 on the larger diameter rotary cutters 34.

The views of FIGS. 2 and 4 illustrate that there are mounted on the table frame 12 a plurality of stationary cutter bars 40 and 42 of two different length sizes. The shorter stationary cutter bars 40 are operatively disposed with respect to the larger diameter rotary blades 34 while the longer stationary cutter bars 42 are operatively disposed relative to the smaller diameter rotary blades 32. The exact positioning of the stationary cutter bars 40 and 42 relative to the periphery of their associated rotary blades 34 and 32 can be established by means of bolts as at 44 passing through an elongated slot 46 formed through the thickness dimension of the stationary cutter bars. Also affixed to the frame proximate the front edge of each of the stationary cutter bars is an angle plate 48 which is provided with a series of threaded bores as at 50 into which are screwed adjustment screws 52. The plate 48 is welded or otherwise affixed to the frame such that when the bolts 44 are loosened and the adjustment screws 52 are rotated, while using a feeler gauge the cutting edge of the stationary cutter bars can be brought within very close tolerance to the periphery of the rotary blades 32 and 34. Thus, with wear, an operator may readily maintain an appropriate spacing between the rotary blades and the stationary cutter bars with which they cooperate to effect optimum shredding of tire segments.

Referring again to the side view of FIG. 1, the flywheel 26 is shielded by a sheet metal cover 54 and also resting on the table surface of the frame 12 is an inlet hopper 56 having an open, funnel-shaped top 58 into which previously sheared tire segments, as at 60, may be inserted. The hopper 56 includes an integrally formed shroud portion 62 which functions as a protective cover for the rotary blade assembly 31. The shroud is shown as being broken away in FIG. 1 to reveal the location of the cutter assembly.

Referring again to FIG. 2, the inlet hopper 56 is shown in cross-section to reveal a feeder drum 64. It is journaled for rotation by means of a shaft 66 which is supported by bearings 68 and 70 supported by the opposed walls of the hopper.

Affixed to the end of the shaft 66 is a large diameter sprocket wheel 72. An endless drive chain 74 passes around the large diameter sprocket 72 as well as around a relatively small diameter sprocket 76 keyed to the shaft 28 supporting the rotary blades 32 and 34. It is apparent that when the motor 18 drives the flywheel 26, via the V-belt 24, the sprocket 76 rotates with the shaft 28 to drive the infeed drum 64 at a relatively low speed.

Projecting radially outward from the surface of the infeed drum 64 are a plurality of short spikes or rods as at 78. These spikes tend to grip onto the tire segment 60 to force the tire segment into engagement with the rotary blades. Portions of the tire casing to be pulverized into chips are thus forced into the relief arcuate recesses 38 between adjacent teeth on the rotary blades 32 and 34 and are carried thereby against the stationary blades 40 and 42 where the tire segment then becomes cut up into pieces by passing between the teeth 36 of the rotary blades and the sharpened front edges of the stationary cutter bars 40 and 42.

There is also affixed to the frame a rake assembly having a plurality of arcuate tines disposed directly beneath the rotary cutter. The spacing between adjacent tines is such that only particles of a predetermined small size may pass between them and into a collection hopper (not shown). Because of the upward curve of the plural tines 78 (FIG. 5), larger chunks of diced-up tire carcass which are too large to pass between adjacent tines are fed back to the arcuate pocket between adjacent teeth on the rotary blades 32 and 34. They are again carried around by the blades and again made to pass between the blades and the stationary cutting bars 40 and 42 which function to reduce the size of the chunks still further.

The resulting chunks of rubber still retain small pieces of steel wire but are of a size that can be fed by an auger or the like into a gas-fired furnace. Such a furnace would be equipped with a blower for providing the necessary oxygen for burning the rubber at a sufficiently high temperature that smoke and odor are practically non-existent. The temperature would also be above the melting point of the steel such that it can liquify and fall through the furnace grates to be periodically collected as slag.

With no limitation intended, the larger diameter rotary blade may have an outside diameter of 10" and a width of about 2". The lesser diameter cutting blade 32 may be of the same width but may have an outside diameter of 8-½". The stationary cutter bars may have a width substantially identical to that of the rotary blades and may be about 1" thick.

A 50-horsepower electrical motor or a 120-horsepower internal combustion engine may be used to drive the tire chipping machine 10. The flywheel preferably weighs approximately 600 lbs. and functions to cause the machine to run fairly smoothly even though abrupt force changes are encountered as tire material is squeezed between the teeth of the rotary cutting blades and the stationary cutter bars before the material shears.

The machine of the present invention is simple in its construction and is economical and efficient in operation and requires no specially skilled workman to operate it. It will be understood that although the machine is particularly designed for disintegrating worn-out vehicle tire casings, it may be also used for other related purposes. Moreover, various changes in the construction and the arrangement of the several parts herein shown and described may be made without departing from the spirit of the invention as disclosed in the following appended claims.

I claim:

1. A machine for reducing automotive tire segments to a pulverized chip comprising, in combination:
   (a) a frame;
   (b) an elongated shaft having first and second ends and journaled for rotation on said frame;
   (c) a massive, steel flywheel secured to said first end of said shaft;
   (d) motor means coupled to said flywheel for rotating said flywheel at a predetermined speed;
   (e) a plurality of rotary cutter blades each with a plurality of teeth uniformly spaced and separated from each other by an arcuate pocket and of a predetermined width dimension mounted on said shaft in side-by-side relation with adjacent ones of said rotary blades being of a different one of two radial dimensions;
   (f) a plurality of stationary cutter bars mounted on said frame and having a sharpened edge adjustably positionable within a predetermined close tolerance to said teeth on said plurality of rotary cutting blades; and
   (g) infeed means including an input hopper and a rotary drum with a plurality of radially projecting spikes journaled for rotation within said hopper for forcing said tire segments into said pockets between the teeth of said rotary cutter blades to be carried thereby against said plurality of stationary cutter bars to shear said tire segments into chips, said rotary drum being driven at a rate which is low compared to the angular velocity of said rotary cutter blades and said flywheel maintaining relatively uniform movement of said cutter blades in spite of sudden changes in the nature of the tire material being encountered between said rotary cutter blades and said stationary cutter bars.

2. The machine as in claim 1 and further including rake means having a plurality of spaced-apart tines attached to said frame for recirculating tire chips greater than a predetermined size back into said pockets of said rotary cutter blades for another passage between said rotary cutter blades and said stationary cutter bars.

3. The machine as in claim 1 wherein said means coupled to said flywheel is an electric motor.

4. The machine as in claim 1 wherein said means coupled to said flywheel is an internal combustion engine.

5. The machine as in claim 1 wherein said stationary cutter bars are positionable by manual adjustment of the spacing between the periphery of said rotary cutters and said sharpened edges of said stationary cutter bars as blade wear occurs.

6. The machine as in claim 5 wherein the means for manually adjusting comprises a stationary plate attached to said frame and extending transverse to said plurality of stationary cutting bars and parallel to said shaft, a plurality of threaded bores extending through said plate at predetermined locations corresponding to the center-to-center distance between adjacent ones of said stationary cutter bars; and a plurality of set screws fitted into said threaded bores with one end of each abutting a corresponding one of said stationary cutting bars.

7. The machine as in any one of claims 1, 2, 3-6 wherein said stationary cutter bars comprises rectangular blocks of hardened steel of first and second lengths and arranged in side-by-side relation, with the shorter length bar aligned with the larger diameter rotary cutter blade and the longer length bar aligned with the smaller diameter rotary cutter blade.

8. The machine as in claim 1 wherein said elongated shaft is journaled for rotation in a pair of pillow blocks attached to said frame in spaced apart relation.

* * * * *